(12) United States Patent
Mehne et al.

(10) Patent No.: US 10,767,554 B2
(45) Date of Patent: Sep. 8, 2020

(54) TURBINE FOR AN EXHAUST GAS TURBOCHARGER WITH A TWO-VOLUTE TURBINE HOUSING AND A VALVE ARRANGEMENT HAVING IMPROVED OUTFLOW

(71) Applicant: CONTINENTAL AUTOMOTIVE GMBH, Hannover (DE)

(72) Inventors: Georg Mehne, Wenzenbach (DE); Christoph Sparrer, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 36 days.

(21) Appl. No.: 16/300,082

(22) PCT Filed: Mar. 22, 2017

(86) PCT No.: PCT/EP2017/056874
§ 371 (c)(1),
(2) Date: Nov. 9, 2018

(87) PCT Pub. No.: WO2017/194237
PCT Pub. Date: Nov. 16, 2017

(65) Prior Publication Data
US 2019/0178150 A1 Jun. 13, 2019

(30) Foreign Application Priority Data
May 12, 2016 (DE) .................. 10 2016 208 160

(51) Int. Cl.
*F02B 37/18* (2006.01)
*F02B 37/02* (2006.01)
(Continued)

(52) U.S. Cl.
CPC .......... *F02B 37/186* (2013.01); *F01D 17/105* (2013.01); *F01D 25/162* (2013.01);
(Continued)

(58) Field of Classification Search
CPC ...... F02B 37/18; F02B 37/183; F02B 37/186; F02B 37/025; F01D 17/105; F01D 25/162; F05D 2220/40; Y02T 10/144; F16K 1/48
(Continued)

(56) References Cited

U.S. PATENT DOCUMENTS 3,423,926 A * 1/1969 Holzhausen .......... F02B 37/183
60/602
4,530,640 A * 7/1985 MacInnes ............... F02B 37/18
60/602
(Continued)

FOREIGN PATENT DOCUMENTS

CN 101548083 A 9/2009
CN 101865032 A 10/2010
(Continued)

*Primary Examiner* — Thai Ba Trieu
(74) *Attorney, Agent, or Firm* — Laurence A. Greenberg; Werner H. Stemer; Ralph E. Locher (57) ABSTRACT

A turbine for an exhaust gas turbocharger has a housing with two exhaust gas volutes, between which a separating wall is provided and which have a common waste-gate opening. The turbine housing is equipped with a linear valve, which has a valve element and a displacement shaft for actuating the valve element. The displacement shaft of the linear valve is led through the separating wall in a separating wall plane and, in the direction of the shaft longitudinal axis of the linear valve, is movably arranged in the separating wall. The valve element is arranged in a separating wall cutout between the exhaust gas volutes and is led out of the area of the exhaust gas volutes in the direction toward the waste-gate opening, toward a valve seat which is formed on the inner side of the waste-gate opening, facing the exhaust gas volutes.

10 Claims, 8 Drawing Sheets (51) Int. Cl.
*F01D 17/10* (2006.01)
*F01D 25/16* (2006.01)
*F16K 1/48* (2006.01)

(52) U.S. Cl.
CPC .......... *F02B 37/025* (2013.01); *F02B 37/183* (2013.01); *F05D 2220/40* (2013.01); *Y02T 10/144* (2013.01)

(58) Field of Classification Search
USPC ....... 60/602; 415/146, 147, 148, 205, 211.1; 251/304
See application file for complete search history.

(56) References Cited

U.S. PATENT DOCUMENTS

| | | | |
|---|---|---|---|
| 6,250,079 B1 | 6/2001 | Zander et al. | |
| 6,269,643 B1 * | 8/2001 | Schmidt | F02B 37/183 60/602 |
| 8,407,997 B2 | 4/2013 | Stilgenbauer et al. | |
| 8,585,355 B2 | 11/2013 | Henderson et al. | |
| 9,359,939 B2 * | 6/2016 | Kindl | F02B 37/183 |
| 9,366,177 B2 | 6/2016 | Kindl et al. | |
| 2017/0350312 A1 | 12/2017 | Karstadt et al. | |
| 2018/0023460 A1 * | 1/2018 | Mawer | F02B 37/183 251/304 |
| 2019/0153929 A1 * | 5/2019 | Sparrer | F02B 37/183 |

FOREIGN PATENT DOCUMENTS

| | | | | |
|---|---|---|---|---|
| CN | 102003272 A | 4/2011 | | |
| CN | 201802477 U | 4/2011 | | |
| CN | 102080578 A | 6/2011 | | |
| CN | 102337961 A | 2/2012 | | |
| CN | 104005837 A | 8/2014 | | |
| DE | 69814660 T2 | 4/2004 | | |
| DE | 102010008411 A1 | 8/2011 | | |
| DE | 202013100774 U1 | 5/2013 | | |
| DE | 102013002894 A1 | 9/2014 | | |
| DE | 202014009873 U1 | 4/2016 | | |
| DE | 102016208158 A1 * | 11/2017 | | F16K 1/48 |
| WO | 2011101005 A1 | 8/2011 | | |
| WO | WO-2017194287 A1 * | 11/2017 | | F02B 37/183 |

* cited by examiner

TURBINE FOR AN EXHAUST GAS TURBOCHARGER WITH A TWO-VOLUTE TURBINE HOUSING AND A VALVE ARRANGEMENT HAVING IMPROVED OUTFLOW

BACKGROUND OF THE INVENTION

Field of the Invention

The invention relates to a turbine for an exhaust-gas turbocharger with a two-volute turbine housing and with a valve arrangement having improved outflow.

Figure 1:
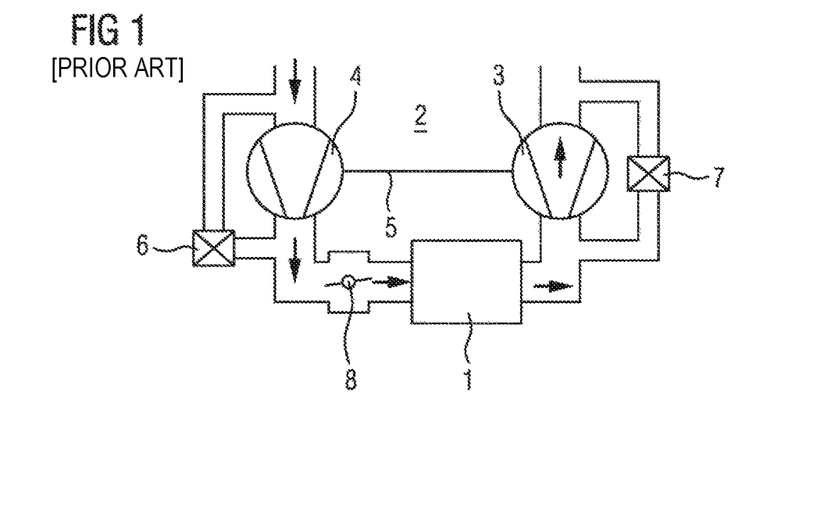
FIG. 1 shows a schematic diagram of an internal combustion engine with an exhaust gas turbine arrangement.

An internal combustion engine 1 which is supercharged by an exhaust-gas turbocharger 2 is characterized by the arrangement of the guidance of fresh air and exhaust gases as illustrated in FIG. 1. During supercharged operation, the exhaust gas flows from the internal combustion engine 1 via the turbine 3, which drives the compressor 4 in the intake tract upstream of the inlet of the engine 1 via a common shaft 5. As a result of the compression of the intake air, more fuel can be admixed per cylinder stroke, and the torque of the engine 1 is increased.

For the sake of clarity, some elements of the air-guiding arrangement are not illustrated in FIG. 1. These are for example an air filter arranged upstream of the compressor, an air flow sensor arranged upstream of the compressor, a charge-air cooler arranged downstream of the compressor, a tank, a crankcase ventilation means arranged downstream of the throttle flap, and a catalytic converter arranged downstream of the turbine. An exhaust-gas recirculation arrangement that may be provided, or secondary air injection means, have likewise not been illustrated.

During supercharged operation, the throttle flap 8 is fully open. The closed-loop control of the supercharging may be effected for example by virtue of a part of the exhaust-gas mass flow being blown off through a wastegate system 7.

Furthermore, on the compressor side, there is arranged a so-called overrun air recirculation system 6, via which excess compressed intake air can be blown off and recirculated into the intake tract.

Figure 2:
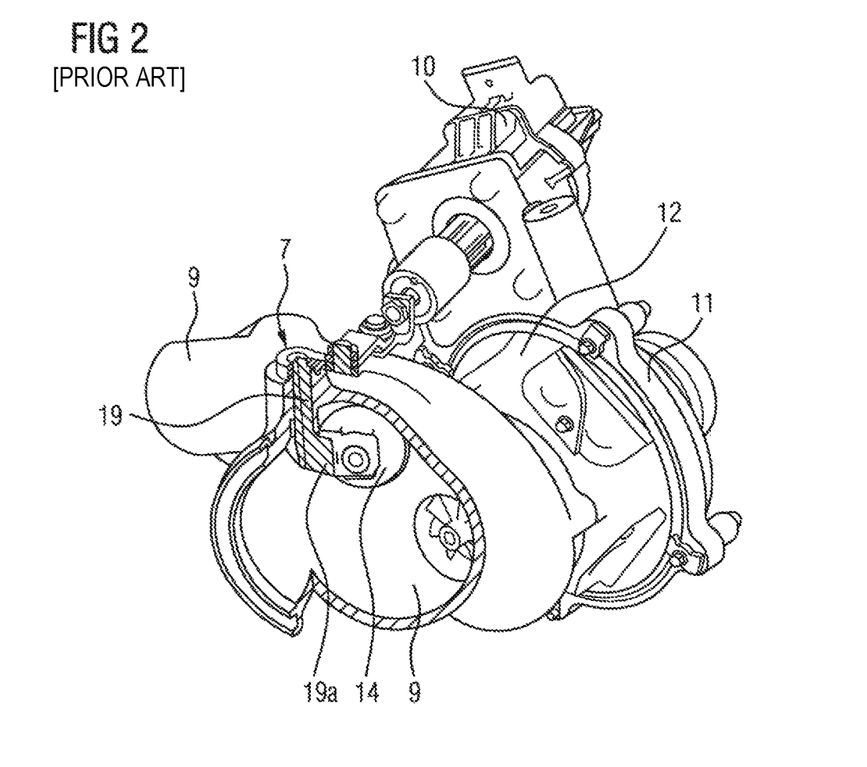
FIGS. 2-8 show various details of the exhaust gas turbine.

FIG. 2 illustrates a possible embodiment of an exhaust-gas turbocharger 2 according to the prior art. This illustration includes a section in the region of the wastegate system. The wastegate system 7 is arranged in the turbine housing 9. The wastegate system 7 is actuated by means of a wastegate actuator 10 which is fastened to the compressor housing 11 using a holder. Between the turbine housing 9 and the compressor housing 11, there is situated a bearing assembly 12 in which the common motor shaft of turbine wheel and compressor wheel is accommodated.

Figure 3:
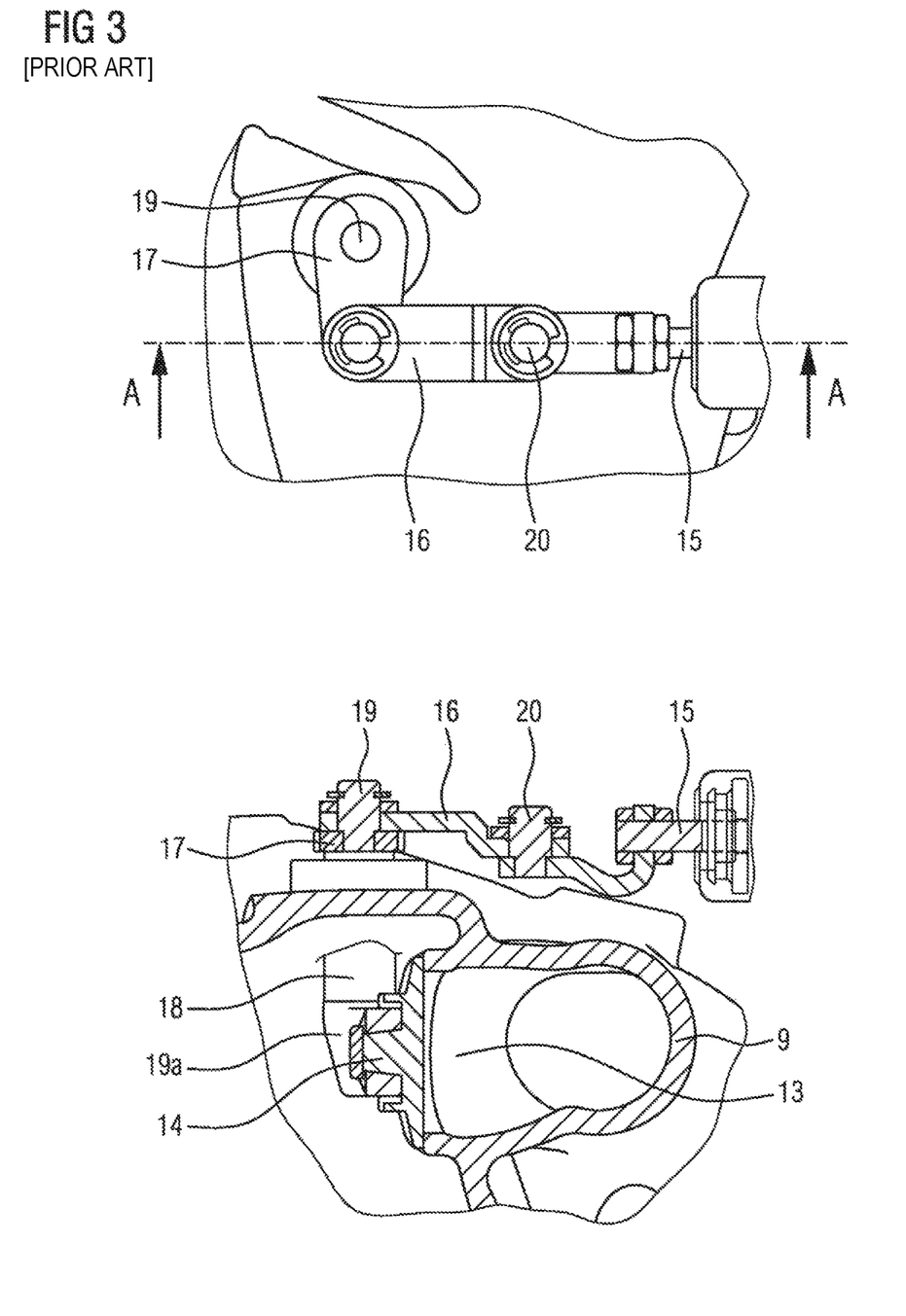

FIG. 3 shows the wastegate system 7 in a plan view and in a sectional illustration of the side view. The illustration shows the wastegate opening 13 in the turbine housing 9, which can be opened up or closed off by means of a flap disk 14. Thus, a part of the exhaust-gas mass flow can be conducted past the turbine impeller. The opening and closing actuation of the flap disk 14 is performed by means of a linear movement of a control rod 15 which is driven in a manner controlled by a pneumatic or electric wastegate actuator 10. This linear movement is transmitted via a connecting plate 16 to an outer wastegate lever 17. The wastegate spindle 19 mounted in a bushing 18 transmits the rotational movement via the pivot arm 19*a* to the flap disk 14. Owing to the linearly guided control rod 15, a compensation joint 20 is additionally required in the kinematic arrangement in order to ensure a compensation of an offset.

The above embodiments relate to exhaust-gas turbochargers with a single-volute turbine housing, which has only one exhaust-gas supply channel, a so-called exhaust-gas volute, which is arranged in spiral fashion around the turbine impeller 9*c*. Corresponding exhaust-gas turbines are also referred to as monoscroll turbines. This technology has the disadvantage that the charge exchange, that is to say the exchange of exhaust gas and fuel-gas mixture, of the individual cylinders of the internal combustion engine during operation can have a mutually adverse effect owing to the pulsating exhaust-gas back pressure. This has an adverse effect on the charging of the cylinders of the engine with fuel-gas mixture, whereby, in turn, the consumption, response behavior and nominal power thereof are impaired.

Figure 4:
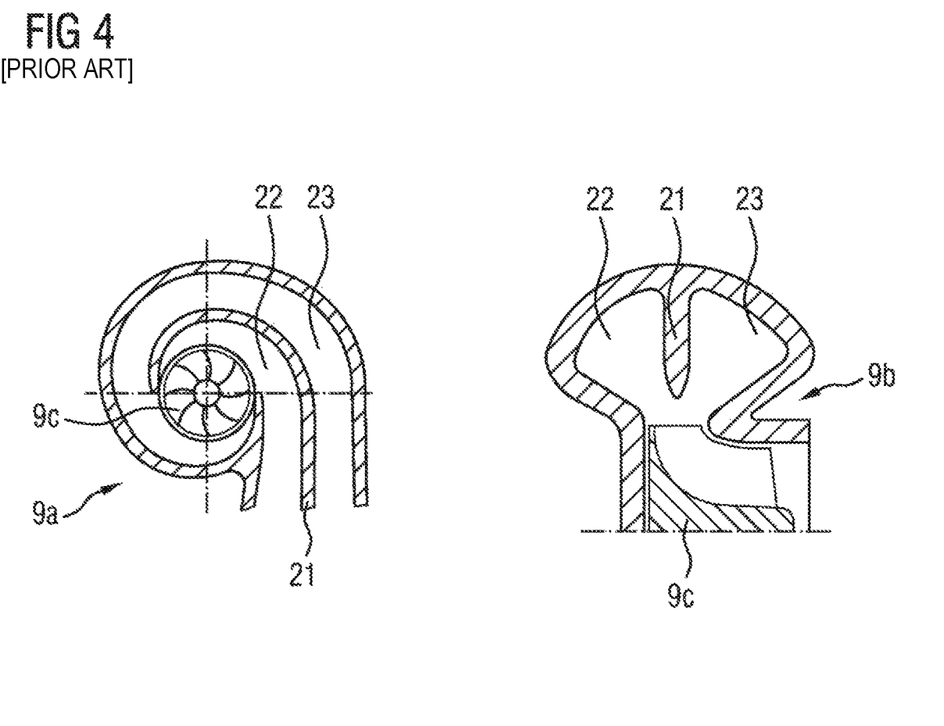

To eliminate or at least alleviate this problem, use may be made of two-volute or multi-volute turbine housings which correspondingly have two or more mutually separate exhaust-gas volutes. Here, a distinction is made between segmented-scroll turbine housings 9*a* and twin-scroll turbine housings 9*b*, as illustrated in FIG. 4.

Both turbines comprise a separating wall 21, which is provided between the two exhaust-gas volutes 22, 23. In the case of the segmented-scroll turbine housing 9*a*, the separating wall 21 is arranged such that the turbine impeller 9*c* is impinged on from both exhaust-gas volutes 22, 23 over in each case 180° over the full impeller inlet width. In the case of the twin-scroll turbine housing 9*b*, the separating wall 21 is arranged in the radial direction with respect to the turbine impeller, whereby the turbine impeller is impinged on from both exhaust-gas volutes 22, 23 over 360° over a fraction, for example in each case 50%, of the impeller inlet width.

Figure 5:
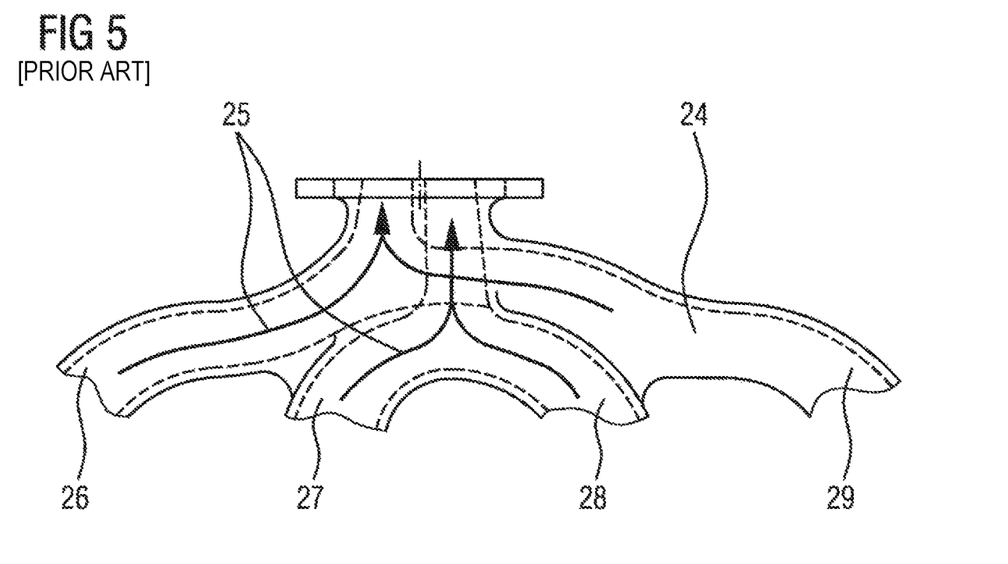

In both turbine construction types, use is made, as can be seen from FIG. 5, of an exhaust-gas manifold 24 in which, in the case of four-cylinder engines, in each case two cylinders, and in the case of six-cylinder engines, in each case three cylinders, are combined to form a tract. Each tract is in turn connected to one exhaust-gas volute of the two-volute turbine housing. It is ensured in this way that the exhaust-gas pulses of the individual cylinders have the least possible adverse effect.

FIG. 5 illustrates the exhaust-gas manifold of a four-cylinder engine, in the case of which in each case two exhaust-gas lines of the respective cylinders are combined to form a tract. Thus, the exhaust-gas lines 26 and 29 of the first and of the fourth cylinder are combined to form a tract. Furthermore, the exhaust-gas lines 27 and 28 of the second and of the third cylinder are combined to form a tract. The arrows shown are intended to illustrate the respective mutually separate exhaust-gas mass flows 25.

As in the case of monoscroll turbines, closed-loop charge-pressure control is realized in the case of exhaust-gas turbochargers with two-volute turbine housings by virtue of excess exhaust gases being blown off via a wastegate system. For a further reduction of the charge-exchange losses in the case of exhaust-gas turbochargers with two-volute turbine housings, a volute connection between the separated exhaust-gas volutes which is switchable or controllable in open-loop or closed-fashion has proven to be advantageous. As in the case of the wastegate system, this involves a valve arrangement which permits a transfer flow of exhaust gas between the exhaust-gas volutes as required. The use of a second valve however has an adverse effect on the costs and the structural space of the exhaust-gas turbocharger.

To avoid these disadvantages, it is already known for the functionalities of wastegate system and volute connection to be realized using a single valve arrangement.

Figure 6:
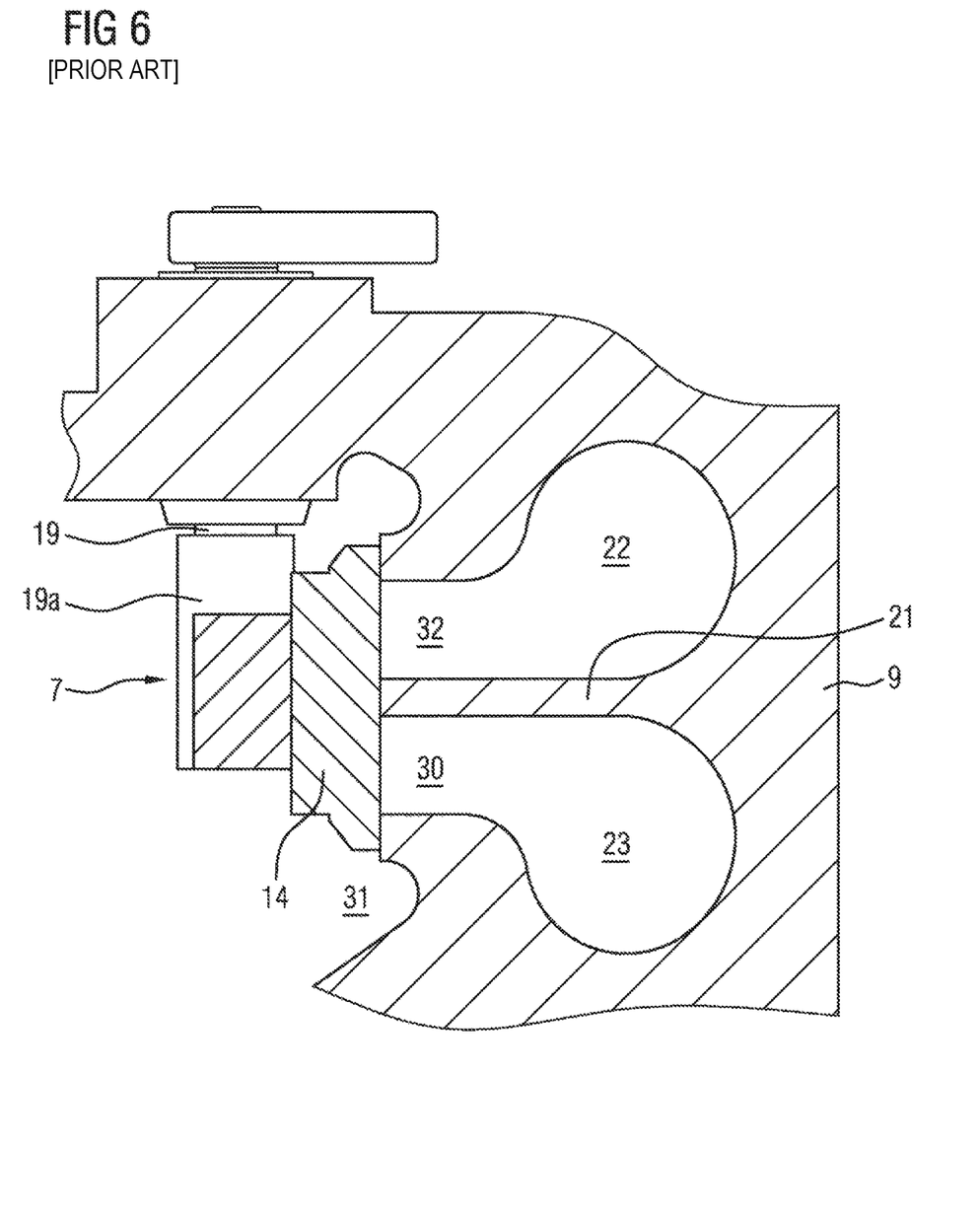

One possible embodiment of a wastegate system 7 of said the type for a two-volute turbine housing 9 is illustrated in FIG. 6. The figure shows the two exhaust-gas volutes 22, 23 of the turbine housing 9 and the two wastegate outlets 30, 32 and the outlet funnel 31.

Both the exhaust-gas volutes 22, 23 and the wastegate outlets 30, 32 are separated from one another by a separating wall 21. It is thus possible for both exhaust-gas volutes 22, 23 to be actuated by means of a common flap disk 14, wherein, when the two wastegate outlets 30, 32 are open, the two exhaust-gas volutes 22 and 23 are simultaneously also fluidically connected to one another via the outlet funnel 31. For the displacement of the flap disk 14, a pivot arm 19a is provided, which is actuated in rotation by means of the wastegate spindle 19. Such a valve arrangement may also be referred to as a pivot arm flap valve. The main function of this embodiment is closed-loop control of the wastegate mass flow of both exhaust-gas volutes using one valve arrangement.

DE 10 2013 002 894 A1 has disclosed a turbine for an exhaust-gas turbocharger, which turbine has a turbine housing in which two volutes through which exhaust gas can flow are provided, which turbine housing furthermore has a bypass channel. Furthermore, a valve is provided which, in the closed state, shuts off both the volute connection and the bypass channel and, in the open state, opens both the volute connection and the bypass channel. This valve is also designed as a pivot arm flap valve and is movable in rotation. It has a pivot arm which is pivotable about a center of rotation and to the end region of which there is fastened a flap disk, which is supplemented by a spherical-segment-shaped valve body.

Figure 7:
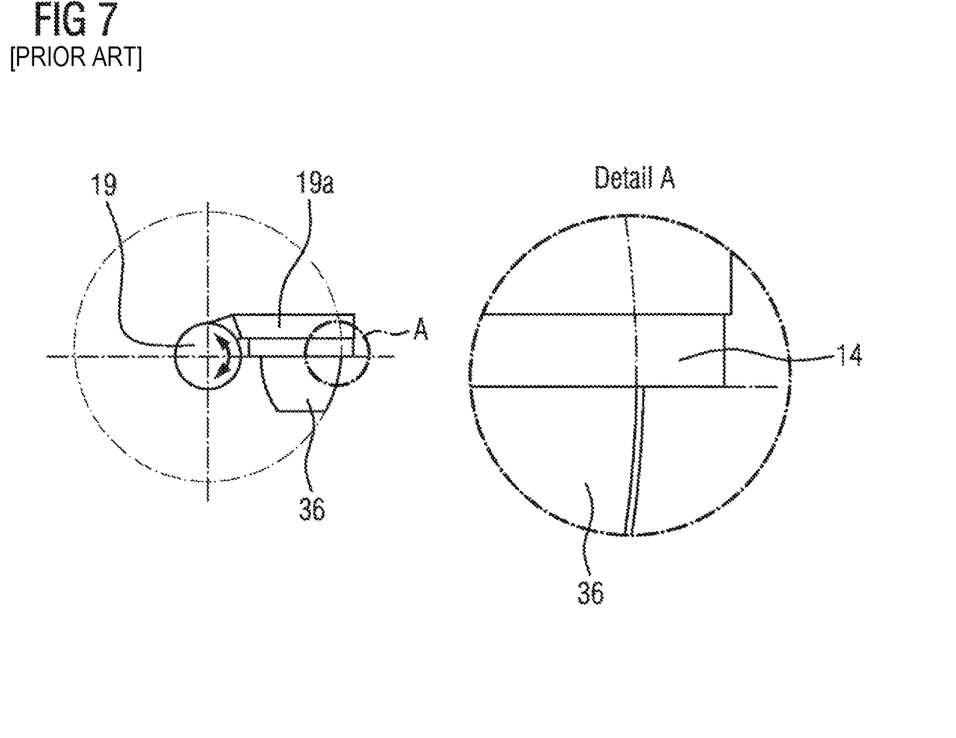
Figure 8:
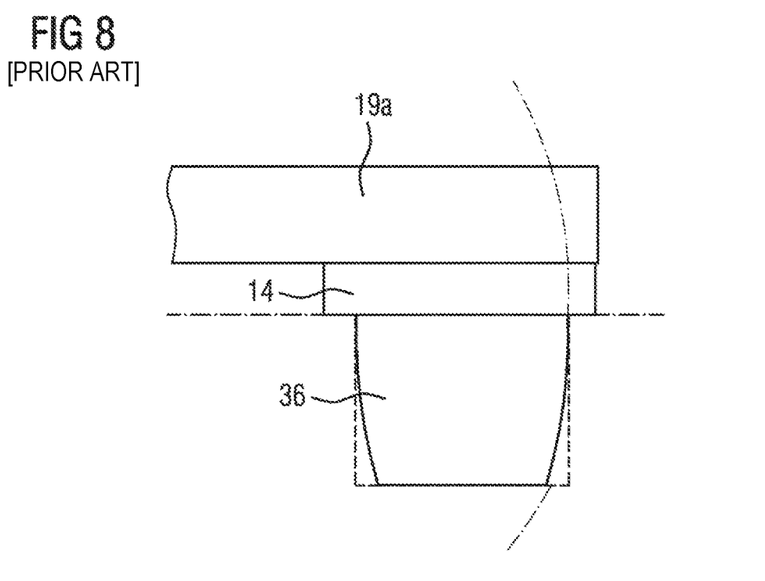

In the case of such a rotationally pivotable pivot arm flap valve being used, which simultaneously acts as a valve element for actuating the wastegate valve and the volute connection, there is limited freedom for the design of the valve body. This will be discussed on the basis of FIGS. 7 and 8, which illustrate the movement of a valve body 36. From these figures, it is clear that the movement of the valve body 36 is limited by a circle (illustrated by dashed lines). Consequently, the outer contour of the valve body 36 must be selected such that the valve body 36, during this movement, does not cross the circular line toward the outside. This has the disadvantage, for example, that the shape of the valve body 36 cannot be freely selected, and for example cannot be cylindrical.

Furthermore, DE 10 2010 008 411 A1 has disclosed an exhaust-gas turbine for an exhaust-gas turbocharger, which exhaust-gas turbine has a turbine housing which has two exhaust-gas volutes, through which exhaust gas can flow, and has a bypass. Between the exhaust-gas volutes and the bypass, there is provided a valve arrangement which is adjustable in translational fashion, that is to say linearly along an axis, which arrangement can also be referred to as linear valve. In this specific case, the illustrated linear valve has, as a valve element, a shaft, a pot-shaped cover and a flap disk. In a first position of this linear valve, the exhaust-gas volutes are fluidically separated from one another, and the bypass is closed. In a second position of this linear valve, the exhaust-gas volutes are fluidically connected to one another, and the bypass is closed. In a third position of this linear valve, the exhaust-gas volutes are fluidically connected to one another, and the bypass is simultaneously open.

In all of the known examples presented, the respective valve element, flap disk, pivot arm etc. are situated in the region of the outlet funnel in the outflowing exhaust-gas mass flow. This results in the exhaust-gas mass flow being impeded and made turbulent, which in turn has an adverse effect on the impingement of flow on an exhaust-gas catalytic converter downstream of the exhaust-gas turbine, which in particular prevents fast and uniform heating of the catalytic converter.

SUMMARY OF THE INVENTION

It is therefore the object of the invention to specify a turbine for an exhaust-gas turbocharger having a two-volute turbine housing and having a valve arrangement designed as a linear valve, the exhaust-gas outflow of which valve arrangement is improved.

This object is achieved by means of a turbine having the features as claimed. Advantageous embodiments and refinements of the invention are specified in the dependent claims.

According to the invention, a turbine for an exhaust-gas turbocharger is proposed, having a turbine housing which has two exhaust-gas volutes through which an exhaust gas can flow and between which there is provided a separating wall and which have a common wastegate opening. The turbine housing is equipped with a linear valve which has a valve element, for opening and closing the wastegate opening, and a displacement shaft, with a shaft longitudinal axis, for actuating the valve element. The turbine is characterized in that the displacement shaft of the linear valve is led through the separating wall in the direction of a separating wall plane spanned by the separating wall, and is arranged movably in the direction of its shaft longitudinal axis in the separating wall, wherein the valve element is arranged in a separating wall cutout between the exhaust-gas volutes and is led out of the region of the exhaust-gas volutes, in the direction of the wastegate opening, toward a valve seat which is formed on the inner side, facing toward the exhaust-gas volutes, of the wastegate opening.

In this way, when the linear valve is in the closed state, the valve element lies sealingly on the valve seat and thus closes off the wastegate opening. At the same time, the separating wall cutout in which the valve element is arranged is filled by the valve element such that a transfer flow of exhaust gas from one exhaust-gas volute through the separating wall cutout to the other exhaust-gas volute is prevented.

The advantages of a turbine having the features as claimed consist in particular in that, during the operation of the turbine, the hot exhaust-gas mass flow that flows out through the wastegate opening when the wastegate valve is open impinges directly, that is to say without prior diversion, and without obstructions, on an exhaust-gas catalytic converter arranged downstream of the turbine housing, such that the exhaust-gas catalytic converter can be brought to its operating temperature more quickly, and can be kept at its operating temperature for longer or in a more effective manner.

Further advantageous embodiments and refinements of the invention according to the dependent claims, and the advantages thereof, will become clear from the following description of exemplary embodiments of the invention on the basis of FIGS. 9 to 13. In the figures:

DESCRIPTION OF THE INVENTION

Components of identical function and designation are denoted by the same reference designations throughout the figures. The illustrated subjects are to be understood as examples of the various embodiments and refinements of the invention, and are not intended to rule out further alternative designs in accordance with the definition of the claims.

Figure 9:
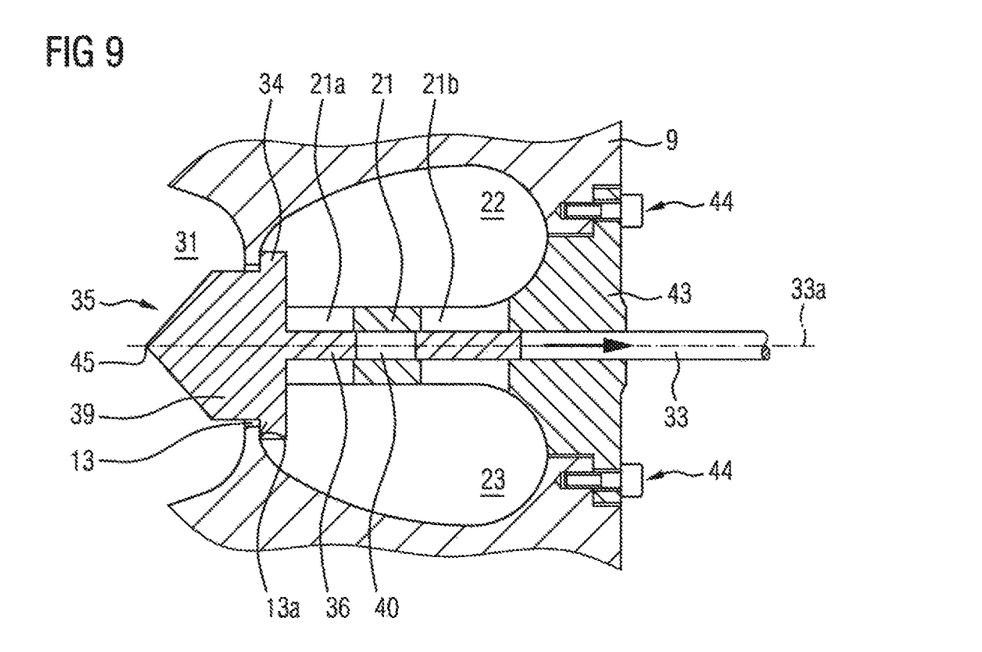
FIG. 9 shows a detail of the turbine housing in a sectional illustration for the purposes of illustrating a first exemplary embodiment of a turbine according to the invention, wherein the linear valve is situated in the closed state.
Figure 10:
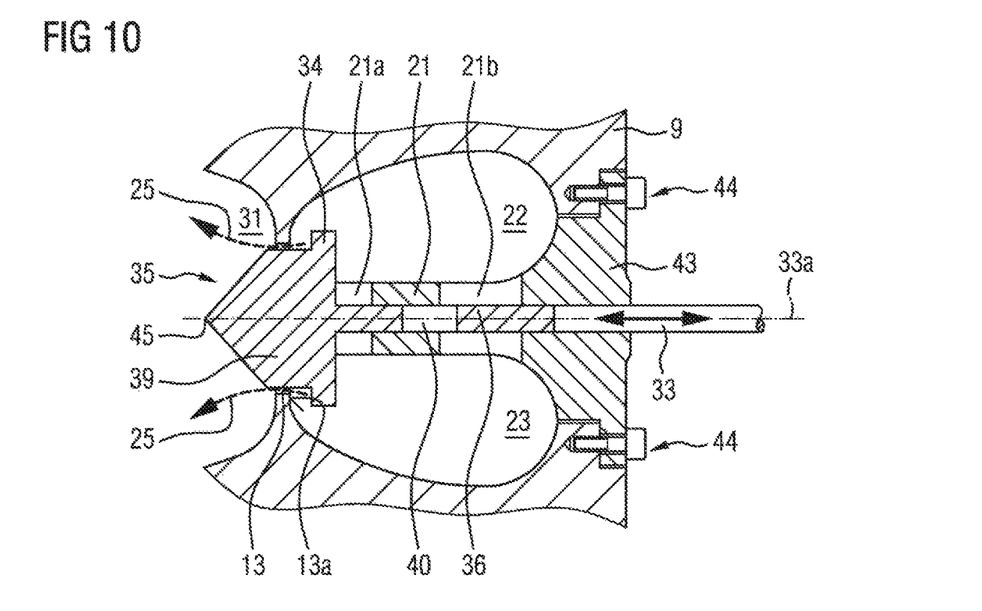
FIG. 10 shows a detail of the turbine housing in a sectional illustration as in FIG. 9, wherein the linear valve is situated in the partially open state.
Figure 11:
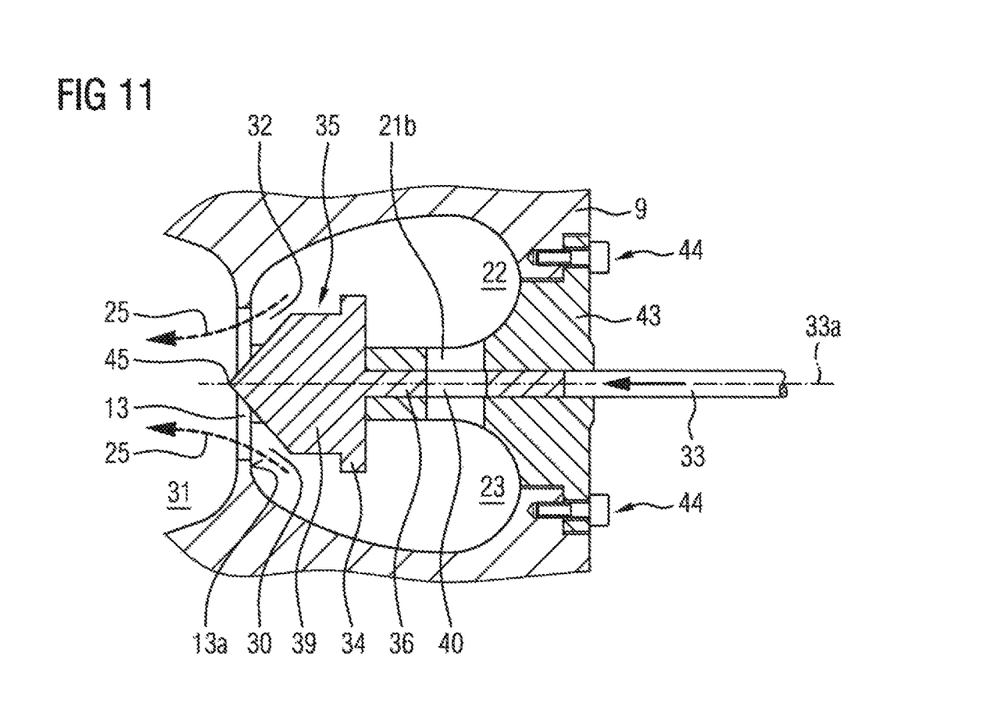
FIG. 11 shows the detail of the turbine housing as in FIGS. 9 and 10, wherein the linear valve is situated in the fully open state.

FIGS. 9, 10 and 11 show in each case a detail of the turbine housing in a sectional illustration for the purposes of illustrating a first exemplary embodiment of a turbine according to the invention, wherein the linear valve is situated in the closed state in FIG. 9, in the partially open state in FIG. 10, and in the fully open state in FIG. 11.

In this first exemplary embodiment, two exhaust-gas volutes 22, 23 through which an exhaust gas can flow are provided in the turbine housing 9. A separating wall 21 is situated between these two exhaust-gas volutes 22, 23. Furthermore, the two exhaust-gas volutes 22, 23 have a common wastegate opening 13 and an outlet funnel 31 adjoining the wastegate opening. Furthermore, in the exemplary embodiment shown, a linear valve is provided for opening and closing the wastegate opening 13 and simultaneously for opening and closing a volute connection by means of a volute connecting window 21b and thus a volute connecting cross section. The linear valve has a valve element 35 and a displacement shaft 33 with a shaft longitudinal axis 33a. The valve element 35 is arranged in a separating wall cutout 21a of the separating wall 21 between the exhaust-gas volutes 22, 23, and has a valve disk 34, a volute valve slide 36 which is fixedly connected to or formed in one piece with the valve disk 34, and a valve body 39.

The valve element 35 is guided out of the region of the exhaust-gas volutes 22, 23, in the direction of the wastegate opening 13, against a valve seat 13a which is formed on the inner side, facing toward the exhaust-gas volutes 22, 23, of the wastegate opening 13. When the linear valve is in the closed state, the valve element 35 lies by way of the valve disk 34 sealingly on the valve seat 13a, wherein, on the outer side, averted from the displacement shaft 33, of the valve disk 34, there is arranged a valve body 39 which projects into the wastegate opening 13 and which, depending on the embodiment, even projects through the wastegate opening 13, as illustrated here.

The valve body 39, at least in one partial region, has a conical, cylindrical, hemispherical or parabolic external geometry, by means of which an opening cross section of the wastegate opening 13 is defined when the linear valve is open. In the example shown in FIGS. 9, 10 and 11, the valve body has a cylindrical outer geometry over a first partial region and has, adjoining this, a conical outer geometry 45.

In this way, as the opening of the linear valve progresses, that is to say during the displacement of the valve element 35, to the right in the drawing, into the region of the exhaust-gas volutes 22, 23, it is firstly the case that the valve disk 34 is lifted off from the valve seat 13a and a ring-shaped gap is opened up between the inner edge of the wastegate opening 13 and the cylindrical partial region of the valve body 39, as can be seen in FIG. 10. That part of the exhaust-gas mass flow 25 which flows out via the ring-shaped gap is symbolized by dashed arrows. As the opening of the linear valve progresses further, the wastegate opening 13 is then increasingly opened up between the conical partial region 45 of the valve body 39 and the inner edge of the wastegate opening 13, as far as a point of maximum opening which is illustrated in FIG. 11. As a result, the exhaust-gas mass flow 25 flowing out via the wastegate opening 13 increases to the same degree and can be discharged unhindered, without obstruction, through the outlet funnel 31 into the exhaust-gas system (not illustrated), where it impinges for example directly onto a catalytic converter (not illustrated) arranged therein.

The volute valve slide 36 is provided between the valve disk 34 and the displacement shaft 33. The displacement shaft 33 and also the volute valve slide 36 are guided through the separating wall 21, provided between the exhaust-gas volutes 22, 23, of the turbine housing 9, and is movable within the separating wall 21 in the longitudinal direction of the displacement shaft 33, that is to say in the direction of the shaft longitudinal axis 33a, as illustrated by the arrow in FIG. 9. As a result of this movement of displacement shaft 33 and volute valve slide 36, the valve disk 34 is also moved in the longitudinal direction of the displacement shaft 33. By means of this movement of the valve disk 34, the linear valve 35 can be moved from a closed position into an opened position, and vice versa.

The displacement shaft 33 may form a single-piece component together with the volute valve slide 36, the valve disk 34 and the closure body 39.

The volute valve slide 36 is received in a corresponding slide recess in the separating wall 21 so as to be adjustable in the direction of the shaft longitudinal axis 33a. The separating wall 21 has, in the region of the valve slide 36, that is to say in the region of the slide recess, a volute connecting window 21b which is formed as an aperture through the separating wall and which is arranged in the separating wall 21 such that it is closed by the volute valve slide 36 when the linear valve is in the closed state, as illustrated in FIG. 9. The volute connecting window 21b is preferably of rectangular shape, though may also be circular, oval, triangular or of some other expedient shape. In the closed state of the linear valve, it is thus advantageously the case that the wastegate opening 13 is closed, and at the same time, the separation of the two exhaust-gas volutes 22, 23 from one another is also ensured.

In the volute valve slide 36, a valve window 40 is provided which is formed as an aperture through the volute valve slide 36. The valve window 40 is arranged such that, as the opening of the linear valve progresses, it progressively opens up the volute connecting window 21b provided in the separating wall 21, as far as a point of maximum overlap of volute connecting window 21b and valve window 40, as illustrated in FIGS. 10 and 11. In this way, as a result of the opening of a volute connecting cross section, the two exhaust-gas volutes 22, 23 are progressively fluidically connected to one another. The valve window 40 is likewise preferably of rectangular shape, though may also be of circular, oval, triangular or some other expedient shape, such that, as a result of interaction of the geometry of volute connecting window 21b and valve window 40, a particular opening characteristic of the volute connecting cross section of the valve stroke of the valve element 35 can be realized. The advantage of this embodiment lies in the fact that, during the opening of the linear valve, over the valve stroke of the valve element 35, firstly a cross section of the wastegate opening 13 defined by the valve body 39 is opened up, and at the same time a defined volute connecting cross section is opened up. Through the coordination of the geometry and arrangement of valve body 39 and volute connecting window 21b in combination with the valve window 40, it is thus possible for the opening characteristic of wastegate opening 13 and volute connecting cross section to be coordinated with one another.

In the exemplary embodiment illustrated in FIGS. 9 to 11, the valve seat 13a of the turbine housing 9 is formed in one piece with the turbine housing directly in the material of the wastegate housing 9 on the inner side, facing toward the exhaust-gas volutes 22, 23, of the wastegate opening 13.

Furthermore, the embodiment illustrated in FIGS. 9 to 11 has the feature that the linear valve and the separating wall 21 arranged in the region of the linear valve, in particular with separating wall cutout 21a, slide recess and volute connecting window 21b, between the exhaust-gas volutes 22, 23, are constituent parts of a separate valve structural unit 43 inserted into the turbine housing (9). The valve structural unit 43 is inserted into the turbine housing 9 and is connected thereto for example by means of a screw connection 44 (as illustrated here), welded connection, press-fit connection, calked connection or riveted connection.

Thus, it is advantageously possible for the separating wall 21, in the region of the linear valve, to be machined separately from the rest of the turbine housing 9 and equipped with separating wall cutout 21b and slide recess. During the installation of the valve structural unit 43 into the turbine housing 9, it is furthermore advantageously possible for the valve element 35, which is composed of valve body 39, valve disk 34, volute valve slide 36 and displacement shaft 33, and which is for example formed in one piece, to initially be inserted, outside the turbine housing 9, into the bore provided in the separating wall 21 of the valve structural unit 43, or the separating wall 21b and the slide recess. The valve structural unit 43 thus formed is then, in a simple manner, from right to left in FIGS. 9 to 11, inserted into the turbine housing 9 and screwed to the turbine housing 9 by means of the screw connections 44.

FIG. 10 shows the first exemplary embodiment illustrated in FIG. 9, wherein, in FIG. 10, the linear valve is situated in the partially open state. In this partially open state of the linear valve, the valve disk 34 of the valve element 35 has lifted off from its valve seat 13a, such that a narrow ring-shaped gap has opened between the radial outer shell of the valve body 39 and the inner edge of the wastegate opening 13 of the turbine housing 9, through which ring-shaped gap an exhaust-gas mass flow 25 can flow out of the exhaust-gas volutes 22 and 23 into the outlet funnel 31. As illustrated by means of the dashed arrows, the exhaust gas flows out of the ring-shaped gap at least approximately in the direction of the projected shaft longitudinal axis 33a of the displacement shaft 33, such that an exhaust-gas catalytic converter arranged in the exhaust-gas channel downstream of the turbine housing is impinged on directly by the exhaust-gas mass flow in an advantageous manner. As a result of this direct, approximately laminar impingement of flow by the hot exhaust gas, the exhaust-gas catalytic converter reaches its operating temperature relatively quickly, and can thus perform its function more effectively than in the case of an impingement of flow by a diverted, turbulent exhaust-gas mass flow.

It can also be seen from FIG. 10 that, in this partially open state of the linear valve, the volute connecting window 21b and the valve window 40 partially overlap, such that the connection between the two exhaust-gas volutes 22 and 23 is also partially open.

FIG. 11 likewise shows the first exemplary embodiment, wherein, in FIG. 11, the linear valve is situated in the fully open state. In this fully open state of the linear valve, the valve disk 34 and the valve body 39 have been fully retracted into the separating wall cutout 21a in the direction of the exhaust-gas volutes 22, 23, such that the wastegate opening 13 is fully open. In this fully open state of the wastegate opening 13, a broader exhaust-gas mass flow 25 can be conducted through the outlet funnel 31 directly in the direction of the exhaust-gas catalytic converter (not illustrated) arranged downstream. The exhaust-gas catalytic converter is in turn impinged on directly by the exhaust-gas mass flow, and can thus be kept at its operating temperature for longer, such that its functionality is ensured over a longer period of time.

It can also be seen from FIG. 11 that, in this fully open state of the linear valve, the volute connecting window 21b and thus the volute connecting cross section in the separating wall 21 are fully open, because the valve window 40 arranged in the volute valve slide 36 is fully overlapping the volute connecting window 21b in the separating wall 21.

Figure 12:
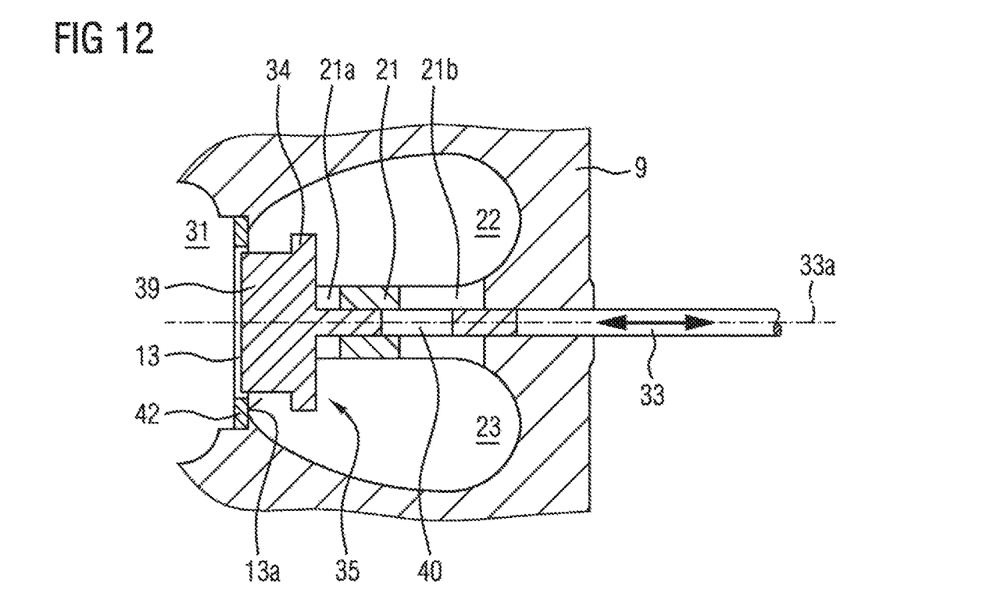
FIG. 12 shows a further detail of the turbine housing in a sectional illustration for the purposes of illustrating a further exemplary embodiment of the invention, wherein the linear valve is situated in the partially open state.

FIG. 12 shows a further exemplary embodiment of the invention, wherein the linear valve is situated in the partially open state. This exemplary embodiment differs from the exemplary embodiment shown in FIGS. 9 to 11 in that the valve body 39 is of cylindrical form over its entire axial extent, and in that the valve seat 13a, which is arranged on the inner side of the wastegate opening 13, is formed by a separate valve seat ring 42 installed in the wastegate opening 13. This valve seat ring 42 has been pressed into the turbine housing 9 in the region of the wastegate opening 13.

Furthermore, in this exemplary embodiment, the linear valve and the separating wall 21 have not been combined to form a separate valve structural unit in this region, but rather have been realized in one piece with the turbine housing 9.

During the installation of the valve element 35 of the linear valve into the turbine housing 9, it is firstly the case here that the valve element 35 is inserted from left to right in FIG. 12 into the turbine housing 9, wherein the displacement shaft 33 and the volute valve slide 36 are guided through or into the corresponding slide recess and the bore in the separating wall 21, and wherein the separate valve seat ring 42 has not yet been pressed into the turbine housing 9, such that the valve disk 34 can be positioned as far as into the region of the exhaust-gas volutes 22 and 23. It is only then that the separate valve seat ring 42 is pressed into the wastegate opening 13 of the turbine housing 9 from the direction of the outlet funnel 31.

In this exemplary embodiment, too, when the linear valve is in the partially open state and also when the linear valve is in the fully open state, the hot exhaust-gas mass flow 25 conducted through the wastegate opening is conducted directly to an exhaust-gas catalytic converter (not illustrated) arranged downstream, such that the exhaust-gas catalytic converter can be brought to its operating temperature more quickly, and can be kept at its operating temperature for longer.

Figure 13:
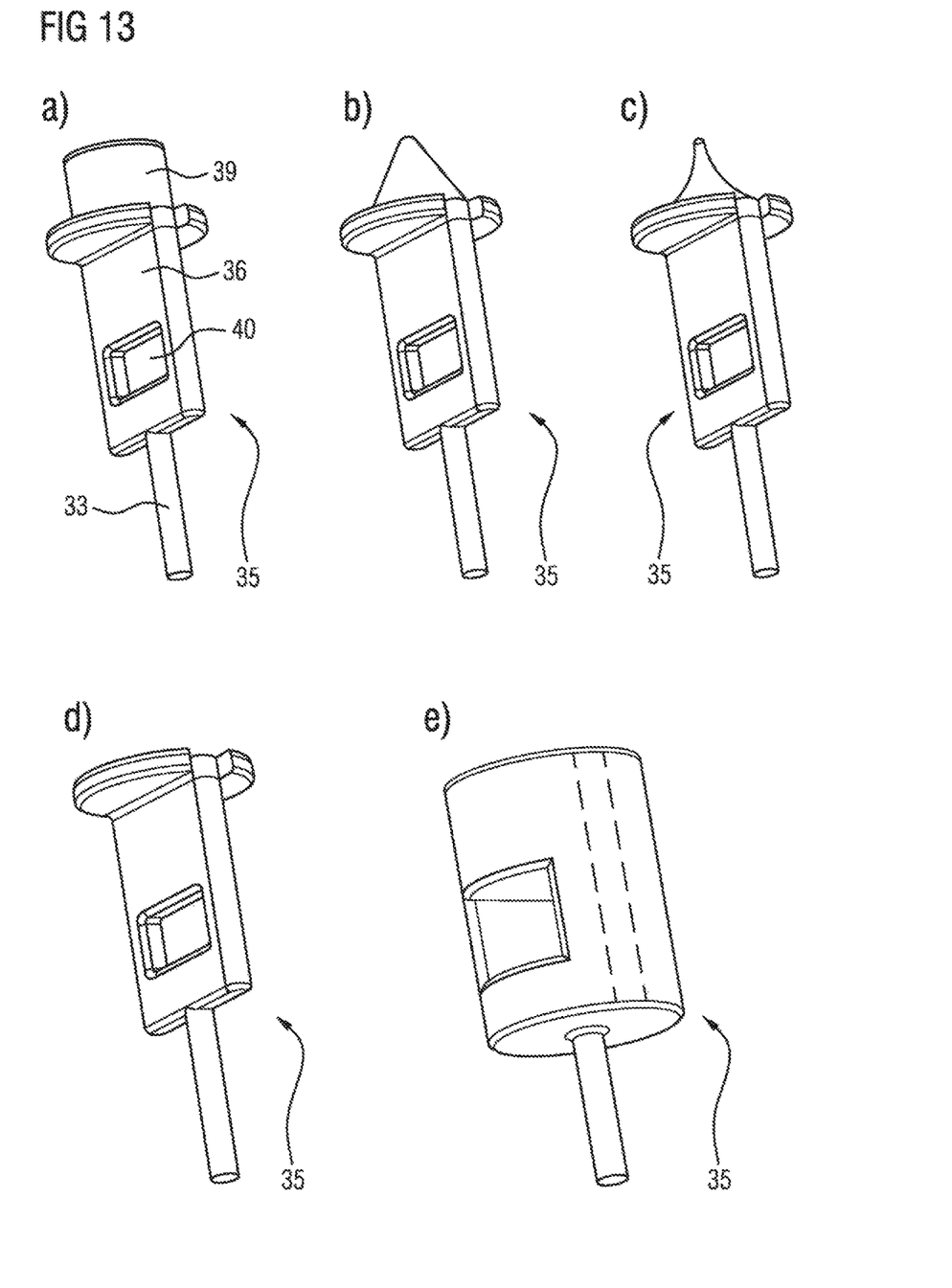
FIG. 13 shows perspective illustrations of alternative embodiments of valve elements of the linear valve that can be used in conjunction with the invention.

FIG. 13 shows perspective illustrations of valve elements 35 that can be used in conjunction with the invention. From these illustrations, it is clear in each case that the valve element 35 has a displacement shaft 33, a volute valve slide 36, within which a valve window 40 is provided, and a valve disk 34. A valve body 39 may be provided on that side of the valve disk 34 which is averted from the displacement shaft 33, though this is not necessary in every case. The valve body 39 is advantageously shaped such that the desired direct impingement of flow on an exhaust-gas catalytic converter arranged downstream by the exhaust-gas mass flow 25 conducted through the wastegate opening is further optimized.

FIG. 13a illustrates a valve element 35 in the case of which the volute valve slide 36 is of cuboidal form and the valve body 39 is of cylindrical form.

FIG. 13b illustrates a valve element 35 in the case of which the volute valve slide 36 is of cuboidal form and the valve body 39 is of conical form.

FIG. 13c illustrates a valve element 35 in the case of which the volute valve slide 36 is of cuboidal form and the valve body 39 is of parabolic form.

FIG. 13d illustrates a valve element 35 in the case of which the volute valve slide 36 is of cuboidal form and in the case of which no valve body is provided on the valve disk 34.

FIG. 13e illustrates a valve element 35 in the case of which the volute valve slide 36 is of cylindrical form and in the case of which the valve disk 34 is formed by the upper closure surface of the cylindrical volute valve slide 36.

In all of these embodiments, when the linear valve is in the closed state, the sealing surface is formed between the outer surface, averted from the displacement shaft 33, of the valve disk 34 and an inner surface, arranged within the exhaust-gas volutes 22, 23, of the valve seat 13a of the turbine housing 9. In all of these embodiments, both when the linear valve is in the partially open state and when it is in the fully open state, an exhaust-gas catalytic converter arranged downstream is directly impinged on by the exhaust-gas mass flow 25 conducted through the wastegate opening.

The invention claimed is:

1. A turbine for an exhaust-gas turbocharger, the turbine comprising:
   a turbine housing having two exhaust-gas volutes for a flow of exhaust gas, a separating wall between said two exhaust-gas volutes, and a common wastegate opening;
   a linear valve having a valve element for selectively opening and closing said common wastegate opening, and a displacement shaft, with a shaft longitudinal axis, for actuating said valve element;
   said displacement shaft extending through said separating wall in a direction of a separating wall plane spanned by said separating wall and movably disposed in a direction of said shaft longitudinal axis in said separating wall; and
   said valve element being disposed in a separating wall cutout between said exhaust-gas volutes and being led out from a region of said exhaust-gas volutes, in a direction of the wastegate opening, toward a valve seat which is formed on an inner side of said wastegate opening facing towards said exhaust-gas volutes.

2. The turbine according to claim 1, wherein said valve element has a valve disk which, in a closed state of said linear valve, lies sealingly against said valve seat, and a valve body on a side of said valve disk which is averted from said displacement shaft, said valve body projecting into said wastegate opening.

3. The turbine according to claim 2, wherein said valve body, at least in one partial region, has an external geometry selected from the group consisting of conical, cylindrical, hemispherical and parabolic, which also defines an opening cross section of said wastegate opening when said linear valve is opening.

4. The turbine according to claim 2, which comprises a volute valve slide disposed between said valve disk and said displacement shaft and fixed with said valve disk, and wherein said valve slide is received, adjustably in the direction of said shaft longitudinal axis, in a corresponding slide recess in said separating wall.

5. The turbine according to claim 4, wherein said separating wall is formed, in the region of said valve slide, with a volute connecting window which is formed as an aperture through said separating wall and which is arranged in said separating wall to be closed by said volute valve slide when said linear valve is in the closed state.

6. The turbine according to claim 5, wherein said volute valve slide is formed with a valve window being an aperture through said volute valve slide and wherein, with a progressive opening of said linear valve, said valve window progressively opens up said volute connecting window formed in said separating wall, to fluidically connect that said two exhaust-gas volutes to one another.

7. The turbine according to claim 1, wherein said valve seat is formed by a valve seat ring installed in said wastegate opening.

8. The turbine according to claim 7, wherein said valve seat ring is pressed into said turbine housing at said wastegate opening.

9. The turbine according to claim 1, wherein said linear valve and said separating wall, arranged in the region of said linear valve, between said exhaust-gas volutes are constituent parts of a separate valve structural unit inserted into said turbine housing.

10. The turbine according to claim 9, wherein said valve structural unit inserted into said turbine housing and is connected to said turbine housing by way of a connection selected from the group consisting of a screw connection, a welded connection, a press-fit connection, a caulked connection and a riveted connection.

* * * * *